United States Patent [19]
Johnson et al.

[11] 3,990,179
[45] Nov. 9, 1976

[54] MULTISECTION HANGING POT AND METHOD

[75] Inventors: Rick S. Johnson; John R. Johnson, both of Minneapolis; Robert J. Kinas, Blaine; Clayton L. Neuman, Coon Rapids, all of Minn.

[73] Assignee: Rick S. Johnson, Minneapolis, Minn.

[22] Filed: Apr. 17, 1975

[21] Appl. No.: 568,826

[52] U.S. Cl. ............................. 47/35; 47/34.12; 47/58; 47/37; 220/4 C; 220/69; 206/423
[51] Int. Cl.² ......................................... A01G 9/02
[58] Field of Search ............... 47/34, 34.1, 34.12, 47/34.2, 35, 37, 34.13, 58; 206/423; 220/4 C, 69

[56] References Cited
UNITED STATES PATENTS

| | | | |
|---|---|---|---|
| 1,077,423 | 11/1913 | Myers | 47/35 |
| 1,572,548 | 2/1926 | Mattison | 47/35 |
| 2,504,031 | 4/1950 | Manning | 47/34.2 |
| 2,605,588 | 8/1952 | Lindstaedt | 47/35 X |
| 2,670,571 | 3/1954 | Waldron | 47/34.12 |
| 2,785,508 | 3/1957 | Coleman, Jr. | 47/34.7 |
| 2,818,681 | 1/1958 | Coplen | 47/37 X |
| 2,893,167 | 7/1959 | Davidson | 47/37 |
| 3,222,819 | 12/1965 | Marcan | 47/35 X |
| 3,394,495 | 7/1968 | Mills | 47/34.12 |

FOREIGN PATENTS OR APPLICATIONS

| | | | |
|---|---|---|---|
| 843,326 | 5/1952 | Germany | 47/34.1 |

Primary Examiner—Edgar S. Burr
Assistant Examiner—James R. Feyrer
Attorney, Agent, or Firm—Dugger, Johnson & Westman

[57] ABSTRACT

A pot for plants primarily used for a hanging pot including at least two interlocking, stacked sections, the lower of which has a plurality of spaced, upwardly open, downwardly extending slots or notches defined in its upper edge of size so that plant stems and branches in the lower section can be laid through the openings with the upper section of the pot removed. Then the upper section can be placed on the lower section to hold the stems in position extending through the slots in the side wall of the finished pot.

8 Claims, 5 Drawing Figures

MULTISECTION HANGING POT AND METHOD

BACKGROUND OF THE INVENTION

1. Field of the Invention

The present invention relates to pots for growing plants, and in particularly to pots which have multiple, interlocking sections.

2. Prior Art

Many different molded plastic pots have been advanced, including hanging baskets or pots. A manual technique has been developed to make a hanging pot or basket which appears to have the plant stems growing right out of the side walls of the basket. This is done by melting (in plastic) or drilling holes through the side walls of an ordinary hanging pot, and then pushing, poking and forcing a plant stem through these holes. The technique is severely limited because of the difficulty of getting the plant stems, and all of the leaves through the hole unbroken. In one process for doing this, the entire plant is wrapped into a tube of plastic film, and is crushed down so that the plastic film tube with the plant inside can be forced through the opening. Even this may damage the leaves, and is a messy, time consuming process.

SUMMARY OF THE INVENTION

The present invention relates to a multisection pot which has openings defined inwardly from one edge of at least one section so that with the sections of the pot separated, the stems and branches of a plant or plants can be laid easily through the openings. Cooperating latches which hold the two adjacent sections together are provided to thereby close the open ends of the openings with the mating edge of the adjacent section. The plant stems then appear to be protruding through holes in the side wall of the pot. The openings are positioned below the upper edge of the pot, and additional plant stems and branches can be permitted to grow out over the upper edge of the pot in the normal manner.

In this way, special effects are easily obtainable. The plants will appear to grow right out of the side wall of the pot or basket to make the pot appear as a ball of leaves.

There may be more than two sections, and the openings can be provided in any of the sections. Further, the parting line between the section may be oriented in other than the horizontal direction if desired.

The multisection pot is easily made, and is easily used without damaging the plants being placed into the pot. The pot permits the making of an attractive hanging basket type without creating a mess.

Therefore, an object of the present invention is to present a low cost, attractive, and easily used multisection hanging pot for making hanging baskets.

DESCRIPTION OF THE PREFERRED EMBODIMENTS

Figure 1:
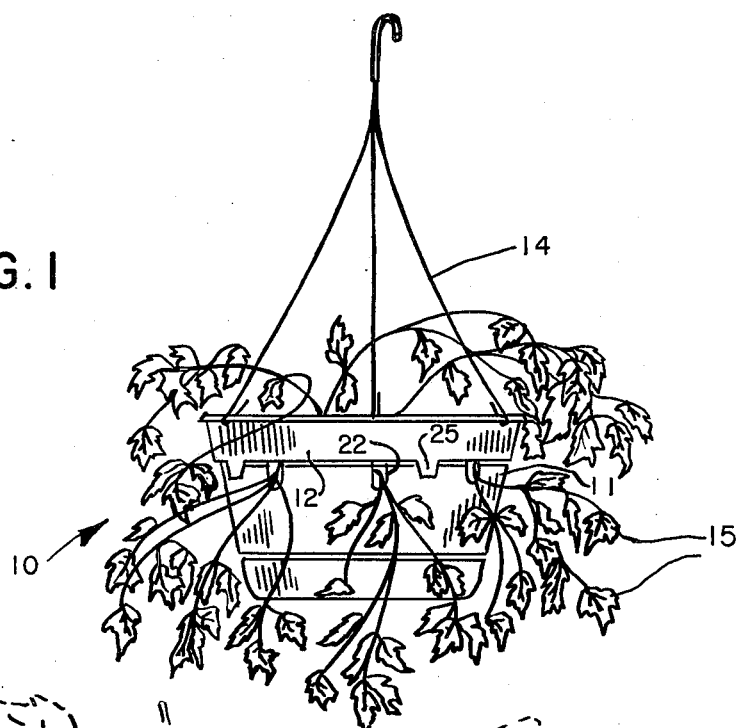
FIG. 1 is a side view of a typical hanging pot made according to the present invention.

A hanging pot illustrated generally at 10 as shown includes a first or lower section 11, and a second or upper section 12 that is removably joined to the lower section as will be more fully explained. The sections each are formed of part frusto conical walls. The upper section 12 has a top rim 13, and the rim is provided with openings into which pot hangers indicated generally at 14 can be placed for supporting the pot. As shown in FIG. 1, the pot is made so that the leaves of a plant indicated generally at 15 will be arranged to completely encompass the pot thereby providing an attractive hanging plant, and with practically no evidence of the pot being seen. In order to make the pot as shown with the plant substantially surrounding the pot, it has been found that it is desirable to have the stems or main branches of the plant protruding out through openings in the side wall of the pot at a point below the upper edge. Additional plants are planted so as to extend out above the upper edge of the pot so that there are multiple plants with main stems coming out the sides and top of the pot.

As shown in the present form of the invention, the lower section 11 has an offset lower portion 16 that is of smaller size, and this offset portion has upright (part conical) walls with drainage openings 17 provided therein. A drainage tray 18 of usual design can be mounted to the lower portion of the lower section 11 and held in place with suitable tabs 19 having lips which overlap the edges of the drainage openings.

The lower section 11 has a wedge shaped rim 20 around the upper edge portion of this section. The wedge shaped rim as shown forms a downwardly facing shoulder 21. At spaced locations along the upper edge of the lower section 11, U shaped slots or openings 22 are provided. These U shaped openings extend from the upper edge of the lower section 11 downwardly a desired distance, and are of a desired width, which is sufficient to provide for passage of a normal diameter stem or branch of a plant used in a hanging pot, for example as shown in dotted lines in FIG. 2.

The upper section 12 has an inwardly extending offset wall section 23 forming a shoulder 24 that is offset inwardly at the lower part or lower edge portion of the upper section, and the wall section 23 fits inside the surface of the lower pot section 11. The shoulder 24 rests on the upper edge of the rim 20.

A plurality of latch members indicated generally at 25 are molded integrally with the side wall of the upper section, and are spaced outwardly from the inner wall of the offset section 23. The latches 25 have tapered cam surfaces 26 facing toward the interior of the pot, and have shoulders 27 formed so that they are upwardly facing when the upper section of the pot is oriented in its normal position. These latches 25 thus are made so that they will pass to the outside of the rim 20 of the lower section when the upper section 12 is placed downwardly onto the lower section 11. It should be noted that in the portions of the upper section aligned with the latches, the offset wall section 23 is interrupted so that the latches can be easily molded and still include the interior shoulder 27. This interrupted portion of offset wall section 23 is shown at 28 in FIG. 3. Also see FIG. 2 where a portion of the wall of the offset section 23 and a portion of the upper edge of the lower section 11 are broken away to show details.

Figure 2:
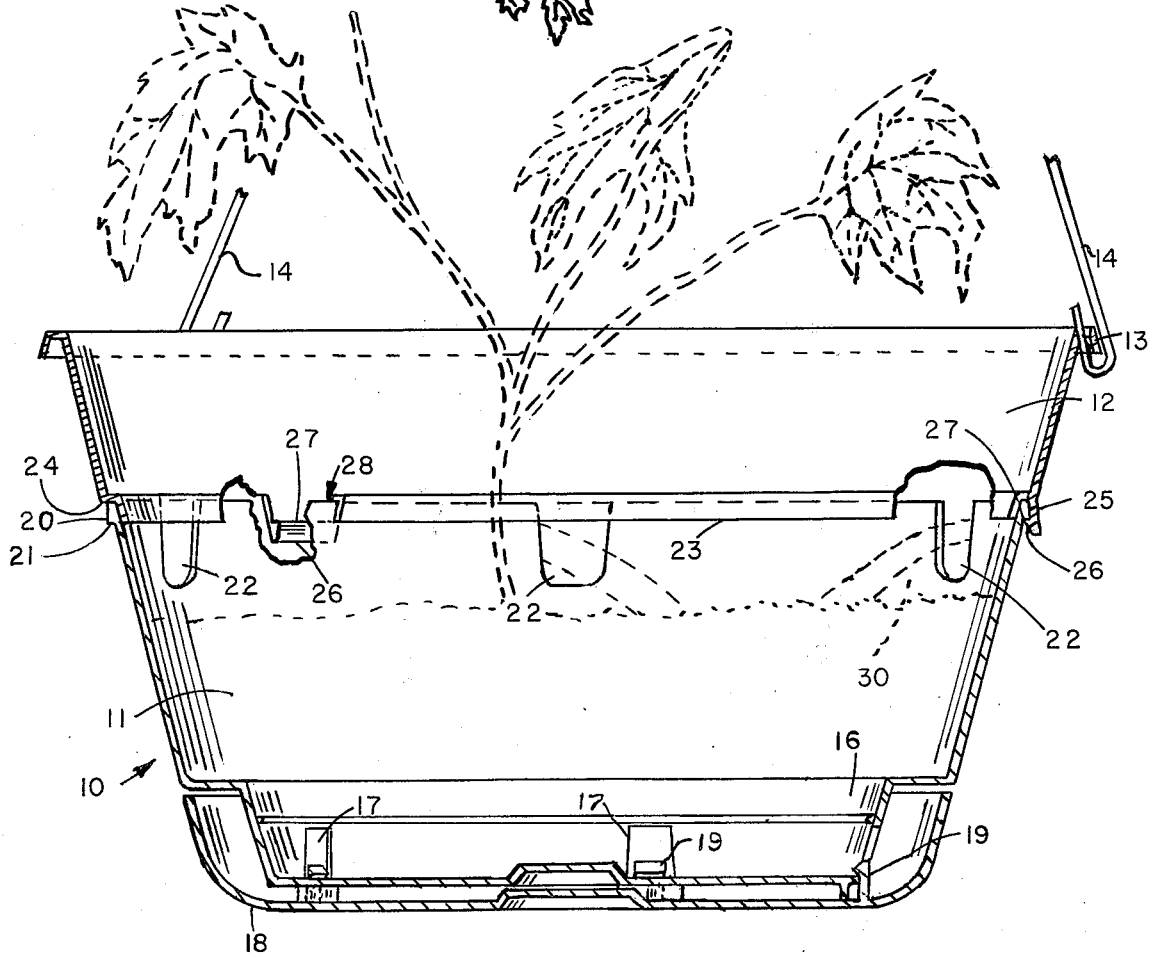
FIG. 2 is a vertical sectional view of the pot of FIG. 1 taken as on line 2—2 in FIG. 3.
Figure 3:
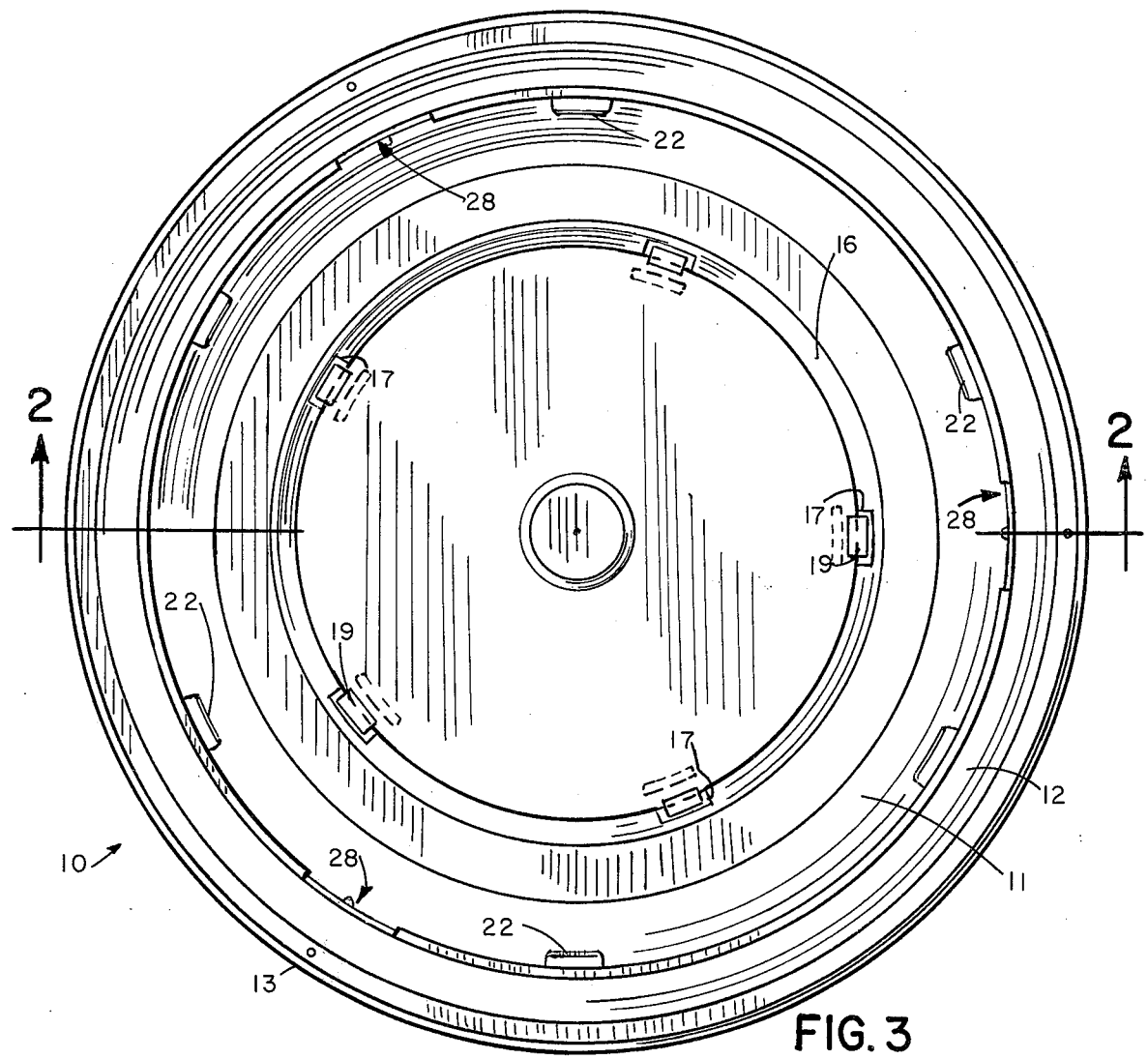
FIG. 3 is a top plan view of the pot of FIG. 2.
Figure 4:
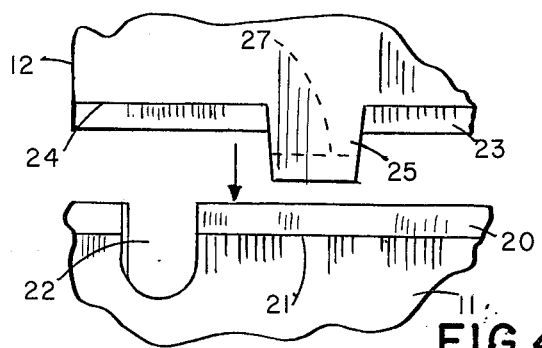
FIG. 4 is an enlarged side view showing the upper section of the pot about to be placed down onto the lower section of the pot.

The upper pot section 12 can be latched into place in the lower pot section 11 merely by pushing downwardly once the upper section is adjacent the lower section. The latch surface 26 will slide over on the outside of the rim 20 and the shoulder 27 will snap into place to thereby be held by the shoulder 21 of the rim of the lower section. The upper section also can be rotated with respect to the lower section while the latches are engaged as shown in FIG. 2, to position where the latches align with the openings 22. In many instances this will make it easier to unlatch because the major portion (or if desired all) of the shoulder 27 will not be engaging the shoulder 21.

The pot is made of a suitable plastic material that can be molded, and of course has some resilience so that the latch principle will work. The latches can be individually sprung outwardly from the rim so that the shoulder 27 will clear the shoulder 21 and the upper section can be removed.

While upper and lower sections are shown, with the openings in the upper edge of the lower section, the slots can be placed in the lower edge of the upper section, or more than two sections can be used. Further the sections could be divided in a different manner, for example two or more sections which mate along vertical lines may be used.

Figure 5:
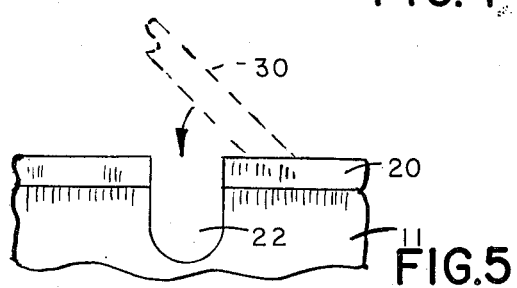
FIG. 5 is a fragmentary side view of a portion of the pot showing the openings into which a plant stem may be placed with the mating section removed.

In the process of placing a plant in the pot shown, the upper section is removed and soil can be placed in the lower section up to a desired level, and an individual plant which may already have been started, can be placed in this soil. The stem indicated generally at 30 can easily be laid down into the U shaped openings. This placement also is indicated in FIG. 5, where the arrow indicates the way that a stem 30 can be laid through the open top U shaped opening.

As shown, the pot has six openings 22, but of course the number of openings can be varied to suit the circumstances. There can be more or less openings than those shown. Further, the depth of the openings can be varied as desired, as can the width. Openings also can be provided in both mating sections, along the mating edges thereof.

Once the number of plants that are desired have been positioned with their stems protruding out through the openings 22, additional plants can be placed in the soil in the lower section with the stems extending up over the top of the pot also as shown in dotted lines as a typical example in FIG. 2. Further, if it is desired, the openings 22 may be suitably blocked or closed after the stems have been placed through the openings to prevent soil from passing through the openings. Then soil can be added to the desired level in the pot and additional plants can then be placed in the upper section of the pot.

The offset section 23, as shown, will also shield drainage from the upper section so it does not run freely out through the openings 22.

It can be seen that the pots can easily be molded from suitable material such as a thermoplastic material. The latches 25 depend directly from the side wall of the upper section 12. Thus benefits of an attractive hanging plant are obtainable with little effort, and with low cost.

While the pot has been described as a hanging pot, it also can be supported on a table or plant stand, and the appearance of the growing of the stems right out from the side wall of the pot is present regardless of how the pot is supported. The pot also can be made up in a variety of sizes, heights, and shapes. It is apparent that one or more additional sections employing the principles of removably latching of the sections together may be added.

What is claimed is:

1. A multiple section hanging planter comprising in combination:
    a. an upper planter section having a top peripheral rim defining a top opening to the planter cavity and having a lower annular perimetric edge portion,
    b. means forming a closure for the upper section including a second section having an upper annular perimetric edge portion which underlyingly is mated with the lower perimetric edge portion of the upper section,
    c. means for suspending the planter to form a hanging planter,
    d. one of said edge portions having a plurality of circumferentially spaced notches which extend vertically for a distance away from the other section said distance being greater than any overlap of said mated edge portions, said notches opening to the line of the mated edges of said edge portions between said notches so that said notches provide a horizontal opening extending substantially entirely across the diameter of said planter which is unobstructed by the walls of either section whereby plants on the interior of the planter can extend and grow horizontally through said notches, and
    e. means to releasably latch said upper and lower sections together.

2. The combination of claim 1 and means to removably affix a saucer to the bottom of the lower section.

3. The combination as specified in claim 1 wherein said means to releasably latch includes an outwardly extending shoulder on one of said sections and an inwardly extending shoulder on the other of said sections, means mounting at least one of said shoulders comprising a resilient member whereby said shoulders may be mated with each other to position where they engage to normally prevent separation of said sections.

4. A multiple section hanging planter comprising in combination:
    a. an upper planter section having a top peripheral rim defining a top opening to the planter cavity and having a lower annular perimetric edge portion,
    b. a second section having an upper annular perimetric edge portion which is overlapped and mated with the lower perimetric edge portion of the upper section,
    c. means for suspending the planter from the top peripheral rim of said planter upper section,
    d. one of said edge portions having a plurality of circumferentially spaced notches which extend vertically for a distance greater than the overlap of said mated edge portions and open to the line of the mated edges of said edge portions between said notches so that said notches provide a horizontal opening extending substantially entirely across the diameter of said planter which is unobstructed by said overlap whereby plants can extend and grow horizontally through said notches,
    e. means to releasably latch said upper and lower sections together, and
    f. means to removably affix a saucer to the bottom of said lower section.

5. The combination specified in claim 4 wherein said means to releasably latch said upper and lower sections together comprises a plurality of individual resilient tabs mounted on one of the sections, and means on the other of said sections and on said individual tabs providing interlocking shoulders when said sections are in assembled position.

6. The combination specified in claim 5 wherein said tabs have cam surfaces that are oriented to cam said tabs outwardly with respect to the other section when the first and second sections are moved together.

7. The combination specified in claim 6 wherein said other section includes a reinforcing rim around the periphery thereof, said reinforcing rim having a surface mating with said tabs, to form one of the interlocking shoulders.

8. The method of providing a hanging pot and plant assembly with stems and branches of the plant protruding from apertures in the sides of the pot and over the top of the pot including the steps of providing a plurality of vertical stackable pot sections including an upper section and a lower section each having annular walls forming an interior cavity, the upper section having a lower annular perimetric edge, and the lower section having an upper perimetric edge mated with said lower perimetric edge along a mating line, at least one of the sections having a plurality of open ended circumferentially spaced, vertically extending notches open to the mating line at the mating edge of the one section and which notches provide an unobstructed opening in horizontal direction substantially entirely across the diameter of the interior cavity, planting a plant in the interior of the lower section spaced from the annular wall of the lower section, placing stems and branches of the planted plant generally laterally extending from the lower section, attaching the upper section to the lower section with lower perimetric edge of the upper section overlying the upper perimetric edges of the lower section and with the stems and branches protruding generally horizontally through said notches with the open edge of the notches of one section being closed by the mating edge of the other section to enclose the stems and branches extending through such slots, and extending plant stems and branches of plants on the interior of the pot out over the top of the upper section.

\* \* \* \* \*